H. B. JONES.
TRIPOD.
APPLICATION FILED MAY 9, 1918
1,300,412.
Patented Apr. 15, 1919.
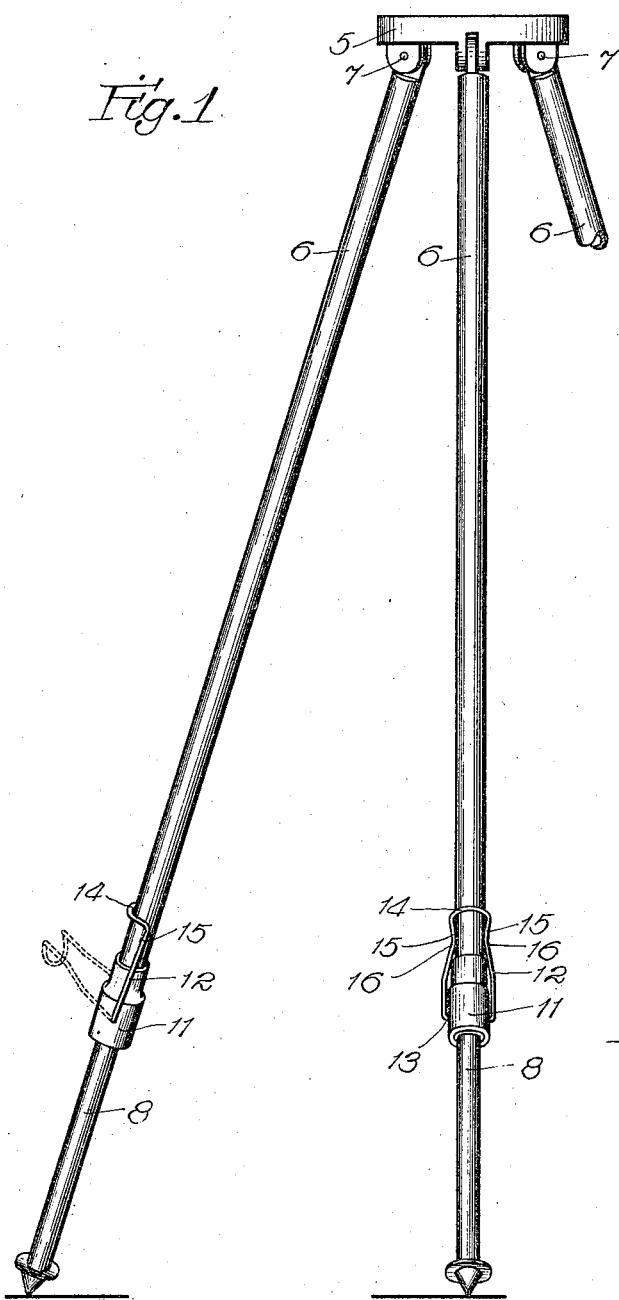
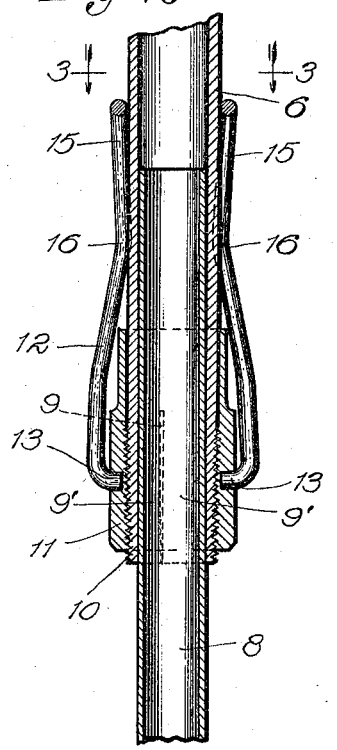
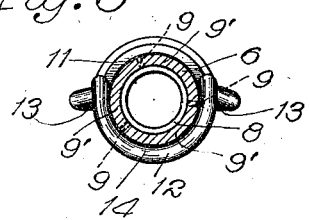
Witnesses:
Inventor
Howard B. Jones
By Williams, Bradbury & Lee
Attys.

UNITED STATES PATENT OFFICE.

HOWARD B. JONES, OF CHICAGO, ILLINOIS, ASSIGNOR TO KLIX MANUFACTURING COMPANY, OF CHICAGO, ILLINOIS, A CORPORATION OF ILLINOIS.

TRIPOD.

1,300,412. Specification of Letters Patent. Patented Apr. 15, 1919.

Application filed May 9, 1918. Serial No. 233,560.

*To all whom it may concern:*

Be it known that I, HOWARD B. JONES, a citizen of the United States, residing at Chicago, in the county of Cook and State of Illinois, have invented a certain new and useful Improvement in Tripods, of which the following is a full, clear, concise, and exact description, reference being had to the accompanying drawings, forming a part of this specification.

This invention relates to improvements in tripods, and is particularly concerned with means for quickly and easily securing the inner and outer telescoping members of the tripod together in any of their adjusted positions.

In particular the objects of my invention are,

First: to provide simple means for securing the telescoping members of the tripod legs together in any of their adjusted positions;

Second: to provide means of the character described, comprising a rotary sleeve having screw-threaded engagement with the slotted end of the outer one of the telescoping members, and a lever secured to said sleeve, whereby the sleeve can be easily rotated to securely lock the two members together; and Third: to provide means for locking the lever for rotating the sleeve in inoperative position.

Further objects will appear as this description progresses, reference being had to the accompanying drawings, in which Figure 1 is a side elevation of my improved tripod, one of the legs of which is broken away;

Fig. 2 is a central longitudinal section through one of the legs showing my improved means for locking the telescoping members of the legs together, and certain details of the structure of my novel means for rotating the sleeve of the clamp; and Fig. 3 is a transverse section on line 3—3 of Fig. 2.

Similar reference characters refer to similar parts throughout the several views.

Referring to the drawing, the reference character 5 indicates the plate to which the camera is clamped by means of a screw (not shown) and to which the outer members 6 of the tripod legs are pivotally connected as indicated at 7. The inner members 8 are slidably mounted within the lower ends of the outer members 6. The lower ends of the outer members are slotted as indicated at 9 to provide a plurality of spring tongues 9'. The outer sides of these spring tongues are provided with a screw thread 10. The bore of the sleeve 11 tapers toward the lower end thereof and is provided with a screw thread which co-acts with the screw thread 10. From this description it will be apparent that when the sleeve 11 is rotated to move the sleeve upwardly with respect to the outer member the tongues 9' will be forced inwardly against the inner member, thereby clamping the inner and outer members together.

While capable of being used for supporting any type of camera, my invention is especially designed for supporting motion picture cameras which are comparatively heavy, and it is consequently necessary that the inner and outer members of the tripod legs should be tightly clamped together. To accomplish this easily I have provided a lever comprising a bail-like member 12, the free ends of which are provided with inturned portions 13 received in bearing openings diametrically disposed in the sides of the sleeve 11. The bight 14 of the bail is turned at substantially right angles with the side members 15 of the bail to provide a loop portion for receiving the upper member when the lever or bail is turned to its inoperative position. The side members 15 are sprung inwardly at points intermediate their ends as indicated at 16, to form spring clamps for engaging the sides of the upper member to hold the lever in its inoperative position.

It is thought that the operation of my improved means for clamping the inner and outer members of the tripod legs together will be clear from the above description. When it is desired to either loosen or tighten the connection between the inner and outer members the lever is moved to the position shown in dotted outline in Fig. 1, and the pressure for rotating the sleeve is applied to this lever. After the sleeve has been rotated sufficiently to either loosen or tighten the connection between the two members, as may be desired, the lever is swung about its pivot points and the spring clamp portions forces past the widest diameter of the outer member, the loop formed by the bight 14 being sufficiently large to permit this operation. The clamping portions of the lever will then hold the lever in its inoperative position so that it will not be in the way of the person operating the camera secured to the tripod. By the use of the sleeve with a threaded tapered bore in combination with the straight threaded tongues, a clamping action is secured throughout the length of the tongues which prevents the inner member from rocking in the outer member.

While I have described the details of the preferred embodiment of my invention, it is to be understood that it is capable of other adaptations and modifications within the scope of the appended claims.

Having thus described my invention, what I claim as new and desire to secure by Letters Patent of the United States is:

1. A tripod having a plurality of legs each comprising a pair of telescoping members, the end of the outer member being provided with a plurality of slits forming tongues, a sleeve having a tapered screw-threaded bore co-acting with said tongues to clamp them against said inner member; a bail having side members, the free ends thereof being pivotally mounted on said sleeve and the bight thereof being turned at an angle to the said members to form a loop for receiving the outer member, the said side members being sprung inwardly intermediate their ends to form spring clamps for engaging the sides of the outer member.

2. A tripod having telescoping supporting legs each comprising inner and outer members, means for locking said inner and outer members in adjusted relation comprising a rotary sleeve, and means for rotating said sleeve, comprising a bail having two side members with their free ends pivotally mounted on said sleeve and the bight thereof turned at an angle to said side members to form a loop for receiving one of said inner and outer members, the said side members being sprung inwardly intermediate their ends to provide spring clamps for engaging said last named member.

3. A tripod having a plurality of legs comprising inner and outer telescoping members, means for locking said members together, comprising a rotary element, and means for rotating said rotary element comprising a lever pivotally mounted on said rotary member and provided with a spring clamping means for holding said lever adjacent one of said members in inoperative position.

4. A tripod having a plurality of legs comprising inner and outer telescoping members, means for locking said members together, comprising a rotary element, a lever pivotally mounted on said rotary member, and means for holding said lever in inoperative position.

In witness whereof, I hereunto subscribe my name this 25th day of April, 1918.

HOWARD B. JONES.

Witnesses:
 EARL F. PIERCE,
 ELLEN NORNHOLM.

Copies of this patent may be obtained for five cents each, by addressing the "Commissioner of Patents, Washington, D. C."